United States Patent
Yamaguchi (10) Patent No.: US 12,518,931 B2
(45) Date of Patent: Jan. 6, 2026

(54) MULTILAYER CERAMIC CAPACITOR

(71) Applicant: Murata Manufacturing Co., Ltd., Nagaokakyo (JP)

(72) Inventor: Shinichi Yamaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 303 days.

(21) Appl. No.: 18/369,891

(22) Filed: Sep. 19, 2023

(65) Prior Publication Data

US 2024/0006124 A1   Jan. 4, 2024

Related U.S. Application Data

(63) Continuation of application No. PCT/JP2022/015285, filed on Mar. 29, 2022.

(30) Foreign Application Priority Data

Mar. 31, 2021   (JP) ............................... 2021-059696

(51) Int. Cl.
| | | |
|---|---|---|
| *H01G 4/30* | (2006.01) | |
| *H01G 4/008* | (2006.01) | |
| *H01G 4/012* | (2006.01) | |
| *H01G 4/12* | (2006.01) | |

(52) U.S. Cl.
CPC ............ *H01G 4/30* (2013.01); *H01G 4/008* (2013.01); *H01G 4/012* (2013.01); *H01G 4/1227* (2013.01)

(58) Field of Classification Search
CPC ........ H01G 4/30; H01G 4/1227; H01G 4/008; H10G 4/005

USPC .................................... 361/301.4, 303, 321.1
See application file for complete search history.

(56) References Cited

U.S. PATENT DOCUMENTS

| | | | |
|---|---|---|---|
| 2006/0138590 A1 | 6/2006 | Suzuki et al. | |
| 2015/0155097 A1* | 6/2015 | Kim .................. | H01G 4/30 29/25.03 |
| 2016/0225525 A1 | 8/2016 | Mizuno et al. | |
| 2016/0358713 A1* | 12/2016 | Doi ................... | H01G 4/0085 |
| 2017/0323727 A1 | 11/2017 | Mukoyama | |

(Continued)

FOREIGN PATENT DOCUMENTS

| | | |
|---|---|---|
| JP | 0869947 A | 3/1996 |
| JP | 1012478 A | 1/1998 |
| JP | 2012028502 A | 2/2012 |

(Continued)

OTHER PUBLICATIONS

International Search Report in PCT/JP2022/015285, mailed Jun. 28, 2022, 2 pages.

(Continued)

*Primary Examiner* — Arun Ramaswamy
(74) *Attorney, Agent, or Firm* — Keating & Bennett, LLP (57) ABSTRACT

A multilayer ceramic capacitor includes a multilayer body and an outer electrode. The multilayer body includes dielectric layers and inner electrode layers alternately stacked with the dielectric layers. Ni in one of first and second inner electrode layers forms a solid solution with Pt, and Ni in the other of the first and second inner electrode layers forms no solid solution with Pt. The one of the first and second inner electrode layers in which Ni forms a solid solution with Pt are coupled to a cathode when the multilayer ceramic capacitor is mounted.

20 Claims, 4 Drawing Sheets

(56) References Cited

U.S. PATENT DOCUMENTS

2019/0304696 A1* 10/2019 Kim .................... H01G 4/12
2020/0343044 A1* 10/2020 Bae .................... H01G 4/12

FOREIGN PATENT DOCUMENTS

| | | | |
|---|---|---|---|
| JP | 2012028503 | A | 2/2012 |
| JP | 2016143709 | A | 8/2016 |
| JP | 2016143764 | A | 8/2016 |
| JP | 6224853 | B2 | 11/2017 |
| WO | 2004070748 | A1 | 8/2004 |

OTHER PUBLICATIONS

Written Opinion in PCT/JP2022/015285, mailed Jun. 28, 2022, 3 pages.

* cited by examiner

MULTILAYER CERAMIC CAPACITOR

CROSS REFERENCE TO RELATED APPLICATIONS

This application claims the benefit of priority to Japanese Patent Application No. 2021-059696 filed on Mar. 31, 2021 and is a Continuation Application of PCT Application No. PCT/JP2022/015285 filed on Mar. 29, 2022. The entire contents of each application are hereby incorporated herein by reference.

BACKGROUND OF THE INVENTION

1. Field of the Invention

The present invention relates to a multilayer ceramic capacitor.

2. Description of the Related Art

In recent years, size reduction of multilayer ceramic capacitors has progressed at a rapid pace, and multilayer ceramic capacitors are required to have higher characteristics and higher reliability.

In general, such a multilayer ceramic capacitor has a structure including an effective dielectric portion in which a plurality of dielectric ceramic layers and a plurality of inner electrodes are stacked and cover layers that are disposed on the upper surface and the lower surface of the effective dielectric portion and that contain a primary component akin to the primary component of the dielectric ceramic layer.

In this regard, to realize size reduction of the multilayer ceramic capacitor, thickness reduction of the dielectric ceramic layer has been researched. When a voltage is applied to the multilayer ceramic capacitor, an electrostrictive effect occurs such that the effective dielectric portion extends in the stacking direction. When the thickness of the cover layers disposed on the upper surface and the lower surface of the effective dielectric portion is small, usually, the force for suppressing extension of the effective dielectric portion in the stacking direction due to the electrostrictive effect is weakened, and strain on the effective dielectric portion increases. When the strain on the effective dielectric portion increases, an electric field is concentrated on a portion at which the strain is concentrated in the interior of the effective dielectric portion. As a result, the dielectric breakdown voltage of the multilayer ceramic capacitor is decreased.

As a measure to address such a problem, for example, the multilayer ceramic capacitor described in Japanese Patent No. 6224853 is characterized in that the cover layer is composed mainly of ceramic particles and that, with respect to gaps between ceramic particles in a unit area of the cover layer, the ratio of the area of gaps in which no glass particles are present to the total area of gaps in which glass particles are present and gaps in which no glass particles are present is 80% or more. Japanese Patent No. 6224853 discloses a technology in which adopting the above-described configuration enables the strength of the cover layer to be enhanced, enables strain in the stacking direction due to an electrostrictive effect to be suppressed from occurring, enables an electric field to be suppressed from being concentrated in a gap where the strain is concentrated, and enables the dielectric breakdown voltage to be suppressed from being decreased.

SUMMARY OF THE INVENTION

However, the configuration according to Japanese Patent No. 6224853 can address only the dielectric breakdown voltage resulting from strain in the stacking direction due to the electrostrictive effect. That is, the configuration according to Japanese Patent No. 6224853 is not able to address suppression of a decrease in the dielectric breakdown voltage due to an increase in the intensity of electric field applied to a ceramic element in accordance with thickness reduction of the ceramic element constituting the multilayer ceramic capacitor.

In addition, according to the configuration of Japanese Patent No. 6224853, since a glass component present in the cover layer increases, the glass may be melted in accordance with the type of a plating liquid or flux, and a problem in terms of a deterioration in moisture resistance may occur.

Accordingly, preferred embodiments of the present invention provide multilayer ceramic capacitors each having an improved dielectric breakdown voltage.

A multilayer ceramic capacitor according to a preferred embodiment of the present invention includes a multilayer body including dielectric layers stacked in a stacking direction, a first main surface and a second main surface opposite to each other in the stacking direction, a first side surface and a second side surface opposite to each other in a width direction orthogonal to the stacking direction, and a first end surface and a second end surface opposite to each other in a length direction orthogonal to the stacking direction and the width direction, a plurality of first inner electrode layers on the dielectric layers and exposed at the first end surface, a plurality of second inner electrode layers on the dielectric layers and exposed at the second end surface, a first outer electrode coupled to the first inner electrode layers and on the first end surface, and a second outer electrode coupled to the second inner electrode layers and on the second end surface, wherein the first inner electrode layers and the second inner electrode layers are alternately positioned, the first inner electrode layers and the second inner electrode layers include Ni, Ni included in one of the first inner electrode layers and the second inner electrode layers forms a solid solution with Pt, Ni included in the other of the first inner electrode layers and the second inner electrode layers forms no solid solution with Pt, and the one of the first inner electrode layers and the second inner electrode layers in which Ni forms a solid solution with Pt are coupled to a cathode when the multilayer ceramic capacitor is mounted.

According to a multilayer ceramic capacitor according to a preferred embodiment of the present invention, since Ni included in one of the first inner electrode layers and the second inner electrode layers forms a solid solution with Pt, Ni included in the other of the first inner electrode layers and the second inner electrode layers forms no solid solution with Pt, and the one of the first inner electrode layers and the second inner electrode layers in which Ni forms a solid solution with Pt are coupled to a cathode when the multilayer ceramic capacitor is mounted, the dielectric breakdown voltage of the multilayer ceramic capacitor is improved.

According to preferred embodiments of the present invention, multilayer ceramic capacitors each capable of having an improved dielectric breakdown voltage can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

Figure 1:
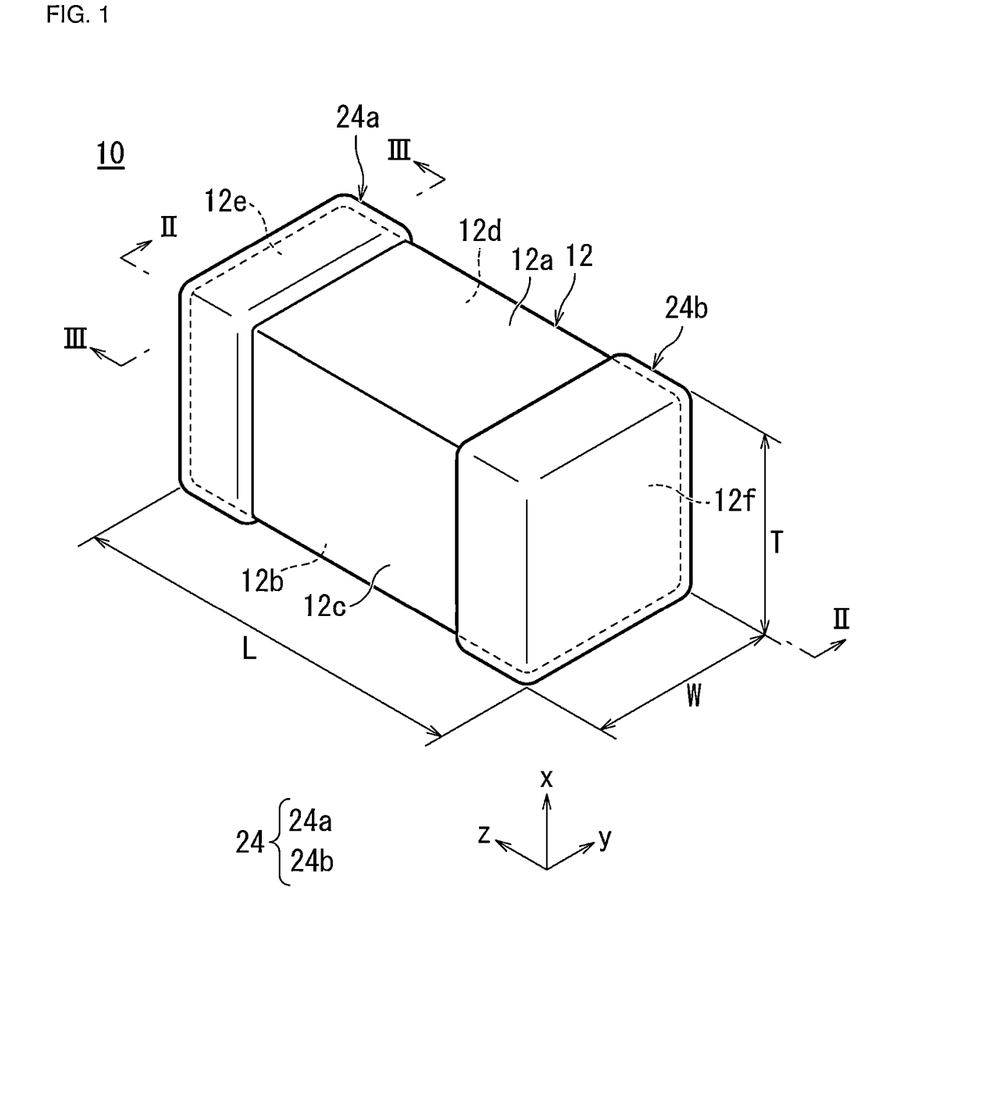
FIG. 1 is an external perspective view illustrating an example of a multilayer ceramic capacitor according to a preferred embodiment of the present invention.
Figure 2:
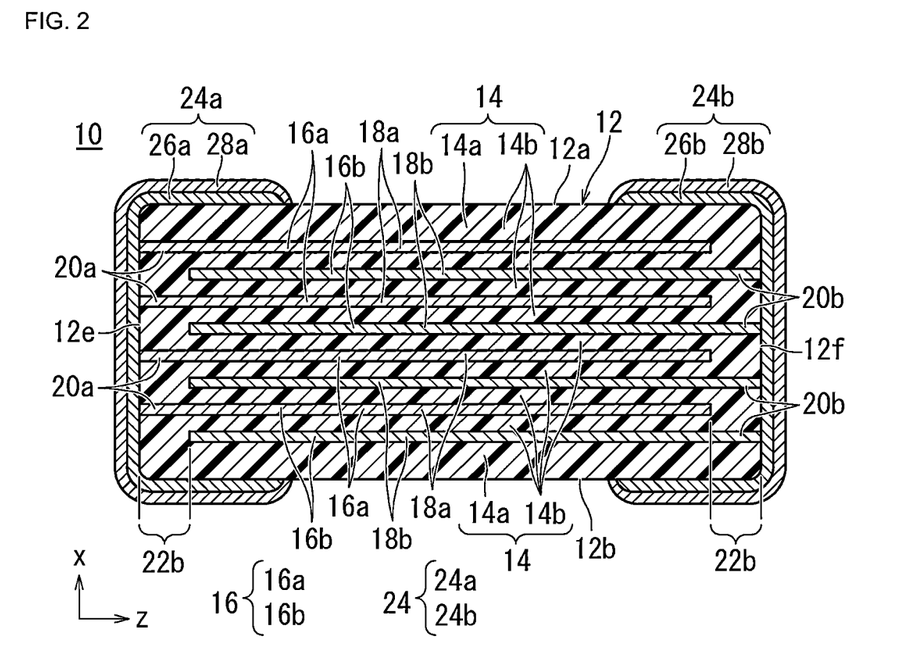
FIG. 2 is a sectional view of the section cut along line II-II in FIG. 1 illustrating a multilayer ceramic capacitor according to a preferred embodiment of the present invention.

A multilayer ceramic capacitor according to a preferred embodiment of the present invention will be described. FIG. 1 is an external perspective view illustrating an example of a multilayer ceramic capacitor according to a preferred embodiment of the present invention. FIG. 2 is a sectional view of the section cut along line II-II in FIG. 1 illustrating a multilayer ceramic capacitor according to a preferred embodiment of the present invention, and FIG. 3 is a sectional view of the section cut along line III-III in FIG. 1 illustrating a multilayer ceramic capacitor according to a preferred embodiment of the present invention.

Figure 3:
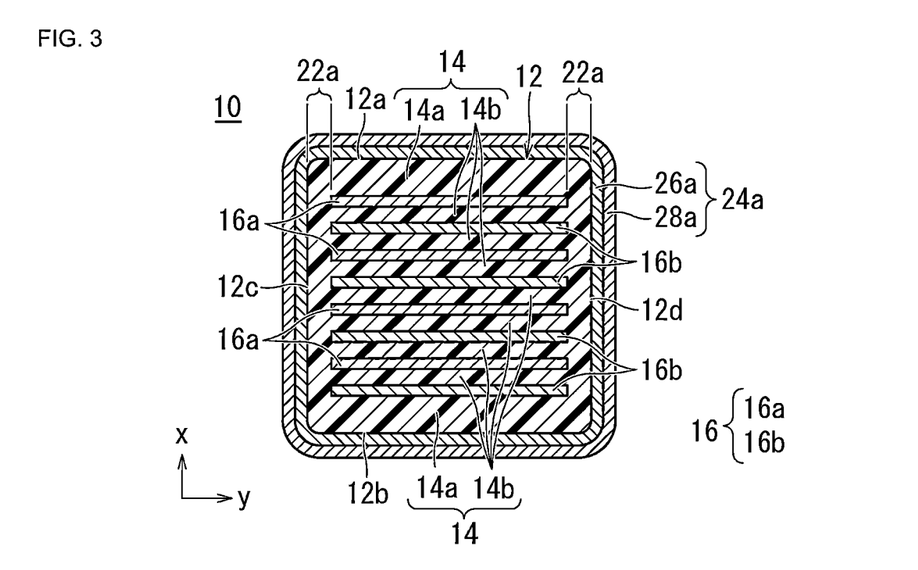
FIG. 3 is a sectional view of the section cut along line III-III in FIG. 1 illustrating a multilayer ceramic capacitor according to a preferred embodiment of the present invention.

As illustrated in FIG. 1 to FIG. 3, a multilayer ceramic capacitor 10 includes a rectangular parallelepiped multilayer body 12.

The multilayer body 12 includes a plurality of dielectric layers 14 and a plurality of inner electrode layers 16 which are stacked. Further, the multilayer body 12 includes a first main surface 12a and a second main surface 12b opposite to each other in the stacking direction x, a first side surface 12c and a second side surface 12d opposite to each other in the width direction y orthogonal to the stacking direction x, and a first end surface 12e and a second end surface 12f opposite to each other in the length direction z orthogonal to the stacking direction x and the width direction y. In the multilayer body 12, corner portions and ridge portion are rounded. In this regard, the corner portions denote the portions at which three adjacent surfaces of the multilayer body intersect, and the ridge portions denote the portions at which two adjacent surfaces of the multilayer body intersect. Some or all of the first main surface 12a, the second main surface 12b, the first side surface 12c, the second side surface 12d, the first end surface 12e, and the second end surface 12f may have unevenness and the like.

The dielectric layers 14 of the multilayer body 12 include outer layer portions 14a and inner layer portions 14b. The outer layer portions 14a are located on the first main surface 12a side and the second main surface 12b side of the multilayer body 12 and are the dielectric layer 14 located between the first main surface 12a and the inner electrode layer 16 nearest the first main surface 12a and the dielectric layer 14 located between the second main surface 12b and the inner electrode layer 16 nearest the second main surface 12b. In this regard, the region interposed between the two outer layer portions 14a is the inner layer portions 14b.

The dielectric layer 14 can be formed of, for example, a dielectric material. It is desirable that a dielectric material powder of the dielectric layer 14 include a perovskite-type oxide including Ba and Ti as a primary component. In this regard, a portion of Ba may be substituted with Ca, and a portion of Ti may be substituted with Zr. In this regard, the dielectric layer 14 may include, in addition to the primary component, for example, rare earth elements, Mn, Mg, and Si as a secondary component.

The raw material powder of the dielectric ceramics is produced by, for example, a solid phase synthesis method. Specifically, compound powders such as an oxide and a carbonate including elements of the primary component are mixed at a predetermined ratio, and calcination is performed. In this regard, a hydrothermal method or the like may be adopted instead of the solid phase synthesis method. The dielectric ceramics according to preferred embodiments of the present invention may include an alkali metal, a transition metal, Cl, S, P, Hf, and the like in an amount within the bounds of not impairing the advantages of preferred embodiments of the present invention.

The thickness of the dielectric layer 14 after firing is preferably about 0.5 µm or more and about 10 µm or less, for example.

The multilayer body 12 includes, for example, a plurality of substantially rectangular first inner electrode layers 16a and a plurality of substantially rectangular second inner electrode layers 16b as a plurality of inner electrode layers 16. The plurality of first inner electrode layers 16a and the plurality of second inner electrode layers 16b are embedded so as to be equidistantly alternately disposed with the dielectric layers 14 interposed therebetween in the stacking direction x of the multilayer body 12.

The first inner electrode layer 16a includes a first opposite electrode portion 18a opposing the second inner electrode layer 16b and a first extended electrode portion 20a that is located at one end of the first inner electrode layer 16a and that extends from the first opposite electrode portion 18a to the first end surface 12e of the multilayer body 12. The end portion of the first extended electrode portion 20a extends to the first end surface 12e and is exposed from the multilayer body 12.

The second inner electrode layer 16b includes a second opposite electrode portion 18b opposing the first inner electrode layer 16a and a second extended electrode portion 20b that is located at one end of the second inner electrode layer 16b and that extends from the second opposite electrode portion 18b to the second end surface 12f of the multilayer body 12. The end portion of the second extended electrode portion 20b extends to the second end surface 12f and is exposed from the multilayer body 12.

The multilayer body 12 includes side portions (hereafter referred to as "W-gaps") 22a between one end of each of the first opposite electrode portion 18a and the second opposite electrode portion 18b in the width direction y and the first side surface 12c and between the other end of each of the first opposite electrode portion 18a and the second opposite electrode portion 18b in the width direction y and the second side surface 12d. In addition, the multilayer body 12 includes end portions (hereafter referred to as "L-gaps") 22b between an end portion opposite to the first extended electrode portion 20a of the first inner electrode layer 16a and the second end surface 12f and between an end portion opposite to the second extended electrode portion 20b of the second inner electrode layer 16b and the first end surface 12e.

The first inner electrode layer 16a and the second inner electrode layer 16b include, for example, Ni.

Figure 4A:
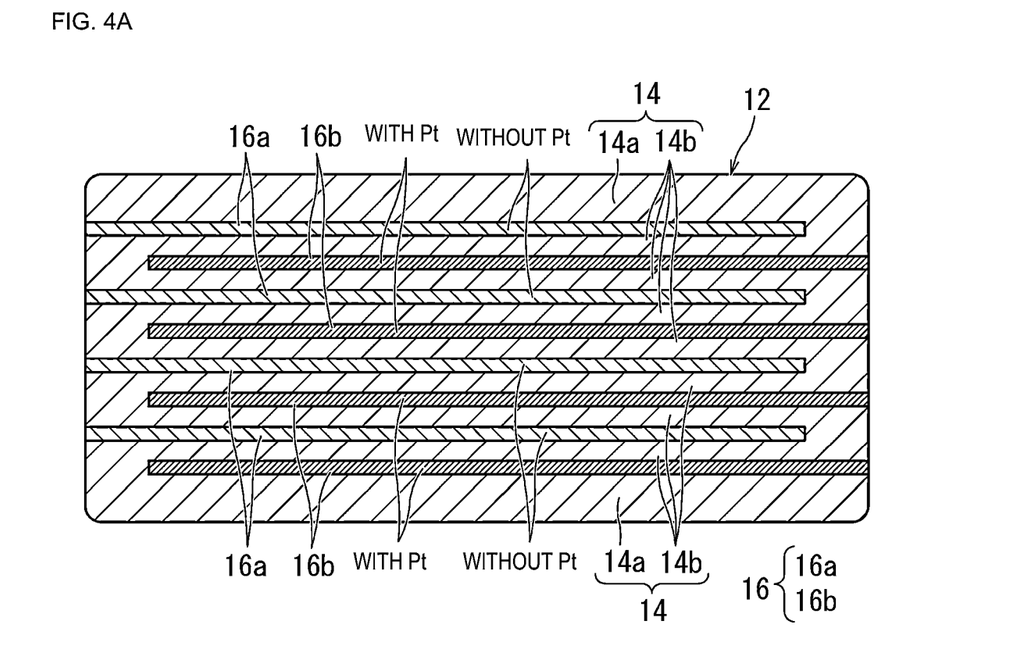
FIG. 4A is an illustration diagram of an LT cross section to indicate presence or absence of Pt in each inner electrode layer of a multilayer body.
Figure 4B:
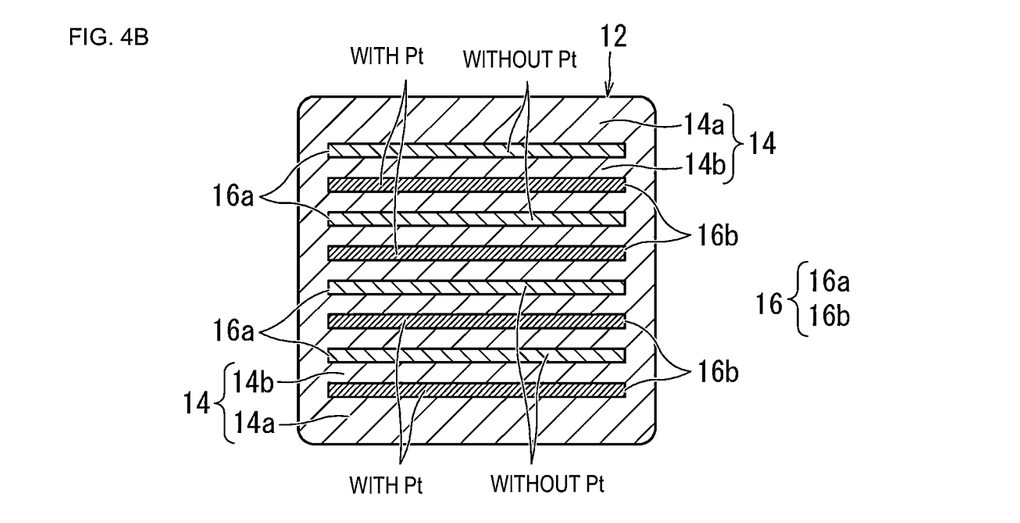
FIG. 4B is an illustration diagram of a WT cross section.

Ni included in one of the first inner electrode layer 16a and the second inner electrode layer 16b forms a solid solution with Pt. On the other hand, Ni included in the other of the first inner electrode layer 16a and the second inner electrode layer 16b forms no solid solution with Pt. Meanwhile, FIGS. 4A and 4B illustrate an example of a multilayer ceramic capacitor 10 in which Ni included in the first inner electrode layer 16a forms no solid solution with Pt, and Ni included in the second inner electrode layer 16b forms a solid solution with Pt.

In this regard, one of the first inner electrode layer 16a and the second inner electrode layer 16b in which Pt forms a solid solution is coupled to a cathode when mounting is performed.

When Ni included in one of the first inner electrode layer 16a and the second inner electrode layer 16b forms a solid solution with Pt, the molar ratio of Pt with respect to the total of Ni and Pt is preferably about 2.6% by mole or more and about 24.7% by mole or less, for example. Setting the molar ratio of Pt with respect to the total of Ni and Pt to be within the above-described range enables the dielectric breakdown voltage to be improved and enables the high-temperature loading life to be improved.

In this regard, Ni included in one of the first inner electrode layer 16a and the second inner electrode layer 16b forming a solid solution with Pt can be examined by, for example, WDX (wavelength-dispersive X-ray analysis).

The first inner electrode layer 16a and the second inner electrode layer 16b may further include dielectric particles having the same composition system as that of the ceramics included in the dielectric layer 14.

In addition, a heterogeneous phase including Ni and an element included in the dielectric layer 14 may be present in the dielectric layer 14 and the inner electrode layer 16.

The thickness of the inner electrode layer 16 is preferably about 0.2 μm or more and about 2.0 μm or less, for example. In this regard, there is no particular limitation regarding the number of the inner electrode layers 16.

The outer electrodes 24 are disposed on the first end surface 12e side and the second end surface 12f side of the multilayer body 12. The outer electrodes 24 include the first outer electrode 24a and the second outer electrode 24b.

The first outer electrode 24a is disposed on the first end surface 12e of the multilayer body 12 and extends from the first end surface 12e to cover a portion of each of the first main surface 12a, the second main surface 12b, the first side surface 12c, and the second side surface 12d. In such an instance, the first outer electrode 24a is electrically coupled to the first extended electrode portion 20a of the first inner electrode layer 16a.

The second outer electrode 24b is disposed on the second end surface 12f of the multilayer body 12 and extends from the second end surface 12f to cover a portion of each of the first main surface 12a, the second main surface 12b, the first side surface 12c, and the second side surface 12d. In such an instance, the second outer electrode 24b is electrically coupled to the second extended electrode portion 20b of the second inner electrode layer 16b.

In the multilayer body 12, the first opposite electrode portion 18a of the first inner electrode layer 16a and the second opposite electrode portion 18b of the second inner electrode layer 16b oppose each other with the dielectric layer 14 interposed therebetween to generate capacitance. Consequently, capacitance can be generated between the first outer electrode 24a coupled to the first inner electrode layer 16a and the second outer electrode 24b coupled to the second inner electrode layer 16b, and the characteristics of a capacitor are realized.

As illustrated in FIG. 2 and FIG. 3, the first outer electrode 24a includes a first underlying electrode layer 26a and a first plating layer 28a disposed on the surface of the first underlying electrode layer 26a in this order from the multilayer body 12. Likewise, the second outer electrode 24b includes a second underlying electrode layer 26b and a second plating layer 28b disposed on the surface of the second underlying electrode layer 26b in this order from the multilayer body 12.

The first underlying electrode layer 26a is disposed on the first end surface 12e of the multilayer body 12 and extends from the first end surface 12e to cover a portion of each of the first main surface 12a, the second main surface 12b, the first side surface 12c, and the second side surface 12d. In this regard, the first underlying electrode layer 26a may be disposed on only the first end surface 12e of the multilayer body 12.

Meanwhile, the second underlying electrode layer 26b is disposed on the second end surface 12f of the multilayer body 12 and extends from the second end surface 12f to cover a portion of each of the first main surface 12a, the second main surface 12b, the first side surface 12c, and the second side surface 12d. In this regard, the second underlying electrode layer 26b may be disposed on only the second end surface 12f of the multilayer body 12.

Each of the first underlying electrode layer 26a and the second underlying electrode layer 26b (hereafter also referred to simply as an underlying electrode layer) includes at least one selected from a baked layer, a thin film layer, and the like. Herein, the first underlying electrode layer 26a and the second underlying electrode layer 26b which are formed from a baked layer will be described.

The baked layer includes glass and a metal. Examples of the metal in the baked layer include at least one selected from Cu, Ni, μg, Pd or a Ag—Pd alloy, Au, and the like. In addition, examples of the glass in the baked layer include at least one selected from B, Si, Ba, Mg, Al, Li, and the like. The baked layer may be multilayered. The baked layer is produced by applying a conductive paste including glass and a metal to the multilayer body 12 and performing baking. Firing may be performed simultaneously with the dielectric layer 14 and the inner electrode layer 16, or baking may be performed after the dielectric layer 14 and the inner electrode layer 16 are fired. The thickness of the thickest portion of the baked layer is preferably about 10 μm or more and about 50 μm or less, for example.

A resin layer including a conductive particle and a thermosetting resin may be formed on the surface of the baked layer. In this regard, the resin layer may be directly formed on the multilayer body 12 without forming the baked layer. Alternatively, the resin layer may be multilayered. The thickness of the thickest portion of the resin layer is preferably about 20 μm or more and about 150 μm or less, for example.

Meanwhile, a thin film layer is formed by a thin-film-forming method such as a sputtering method or a vapor deposition method and is a layer on which the metal particle is deposited and which is about 1 μm or less, for example.

The first plating layer 28a is disposed so as to cover the first underlying electrode layer 26a. Specifically, the first plating layer 28a is disposed on the surface of the first underlying electrode layer 26a corresponding to the first end surface 12e and is preferably set to extend over the surface of the first underlying electrode layer 26a corresponding to the first main surface 12a, the second main surface 12b, the first side surface 12c, and the second side surface 12d. In this regard, when the first underlying electrode layer 26a is disposed on only the surface of the first end surface 12e of the multilayer body 12, it is sufficient that the first plating layer 28a be set to cover only the surface of the first underlying electrode layer 26a.

Likewise, the second plating layer 28b is disposed so as to cover the second underlying electrode layer 26b. Specifically, the second plating layer 28b is disposed on the surface of the second underlying electrode layer 26b corresponding to the second end surface 12f and is preferably set to extend over the surface of the second underlying electrode layer 26b corresponding to the first main surface 12a, the second main surface 12b, the first side surface 12c, and the second side surface 12d. In this regard, when the second underlying electrode layer 26b is disposed on only the surface of the second end surface 12f of the multilayer body 12, it is sufficient that the second plating layer 28b be set to cover only the surface of the second underlying electrode layer 26b.

Regarding the first plating layer 28a and the second plating layer 28b (hereafter also referred to simply as a plating layer), for example, at least one type of metal selected from Cu, Ni, Sn, Ag, Pd, a Ag—Pd alloy, Au, and the like or an alloy including such a metal is used, for example.

The plating layer may be multilayered. In such an instance, it is preferable that the plating layer have a two-layer structure of a Ni plating layer and a Sn plating layer. The Ni plating layer is used to reduce or prevent the underlying electrode layer from being eroded by solder during mounting of the multilayer ceramic capacitor 10, where the Ni plating layer is disposed to cover the surface of the underlying electrode layer. In addition, the Sn plating layer being disposed on the surface of the Ni plating layer enables the wettability of solder used for mounting during mounting of the multilayer ceramic capacitor to be improved so as to facilitate mounting.

The thickness of each layer of the plating layer is preferably about 1 μm or more and about 15 μm or less, for example. It is preferable that the plating layer contain no glass. Further, the proportion of the metal per unit volume of the plating layer is preferably about 99% by volume or more, for example.

Next, the instance in which the first underlying electrode layer 26a and the second underlying electrode layer 26b include a plating electrode will be described.

The first underlying electrode layer 26a includes a plating layer directly coupled to the first inner electrode layer 16a, is disposed directly on the first end surface 12e of the multilayer body 12, and extends from the first end surface 12e to cover a portion of each of the first main surface 12a, the second main surface 12b, the first side surface 12c, and the second side surface 12d.

Meanwhile, the second underlying electrode layer 26b includes a plating layer directly coupled to the second inner electrode layer 16b, is disposed directly on the second end surface 12f of the multilayer body 12, and extends from the second end surface 12f to cover a portion of each of the first main surface 12a, the second main surface 12b, the first side surface 12c, and the second side surface 12d.

In this regard, to form the first underlying electrode layer 26a and the second underlying electrode layer 26b from the plating layer, a catalyst is disposed on the multilayer body 12 as pretreatment.

The first underlying electrode layer 26a including the plating layer is preferably covered with the first plating layer 28a. Likewise, the second underlying electrode layer 26b including the plating layer is preferably covered with the second plating layer 28b.

It is preferable that the first underlying electrode layer 26a, the second underlying electrode layer 26b, the first plating layer 28a, and the second plating layer 28b include, for example, plating of one metal selected from Cu, Ni, Sn, Pb, Au, Ag, Pd, Bi, and Zn or an alloy including the metal.

For example, when Ni is used as the inner electrode layer 16, it is preferable that Cu having favorable bondability to Ni be used as the first underlying electrode layer 26a and the second underlying electrode layer 26b.

In this regard, it is preferable that Sn or Au having favorable wettability be used as the first plating layer 28a and the second plating layer 28b, and it is preferable that Ni having solder barrier performance be used as the first underlying electrode layer 26a and the second underlying electrode layer 26b.

The first plating layer 28a and the second plating layer 28b are formed as the situation demands, for example, as follows. The first outer electrode 24a may include the first underlying electrode layer 26a alone, and the second outer electrode 24b may include the second underlying electrode layer 26b alone. In this regard, the first plating layer 28a and the second plating layer 28b may be disposed as the outermost layers of the first outer electrode 24a and the second outer electrode 24b, and another plating layer may be disposed on the first plating layer 28a or the second plating layer 28b.

The thickness of each layer of the plating layer is preferably about 1 μm or more and about 15 μm or less, for example. It is preferable that the plating layer contain no glass. Further, the proportion of the metal per unit volume of the plating layer is preferably about 99% by volume or more, for example.

The dimension in the length direction z of the multilayer ceramic capacitor 10 including the multilayer body 12, the first outer electrode 24a, and the second outer electrode 24b is denoted as the L-dimension. The dimension in the stacking direction x of the multilayer ceramic capacitor 10 including the multilayer body 12, the first outer electrode 24a, and the second outer electrode 24b is denoted as the T-dimension. The dimension in the width direction y of the multilayer ceramic capacitor 10 including the multilayer body 12, the first outer electrode 24a, and the second outer electrode 24b is denoted as the W-dimension.

There is no particular limitation regarding the dimensions of the multilayer ceramic capacitor 10. For example, the L-dimension in the length direction z is about 0.2 mm or more and about 3.2 mm or less, the W-dimension in the width direction y is about 0.1 mm or more and about 2.5 mm or less, and the T-dimension in the stacking direction x is about 0.1 mm or more and about 2.5 mm or less. In this regard, the L-dimension in the length direction z is not limited to being larger than the W-dimension in the width direction y. The dimensions of the multilayer ceramic capacitor 10 can be measured by using a microscope.

2. Method for Manufacturing Multilayer Ceramic Capacitor

Next, a non-limiting example of a method for manufacturing a multilayer ceramic capacitor according to a preferred embodiment of the present invention will be described.

(a) Production of Dielectric Raw Material Powder

Initially, a $BaTiO_3$ powder serving as a primary component is prepared. Specifically, predetermined amounts of $BaCO_3$ powder and $TiO_2$ powder are weighed and mixed by using a ball mill for a predetermined time. Thereafter, the $BaTiO_3$ powder serving as a primary component is obtained by performing heat treatment.

In this regard, it is desirable that a dielectric material powder for the dielectric layer 14 include, as a primary component, a perovskite-type oxide including Ba and Ti.

Subsequently, a powder of each of $Dy_2O_3$, MgO, MnO, and $SiO_2$ serving as a secondary component is prepared. Thereafter, 0.75 parts by mole of $Dy_2O_3$, 1 part by mole of MgO, 0.2 parts by mole of MnO, and 1 part by mole of $SiO_2$ relative to 100 parts by mole of $BaTiO_3$ serving as the primary component are weighed. These powders are mixed with the $BaTiO_3$ powder serving as the primary component, mixing is performed by using a ball mill for a predetermined time, and drying and dry pulverization are performed so as to obtain a raw material powder.

(b) Production of Multilayer Ceramic Capacitor

Next, a polyvinyl-butyral-based binder and an organic solvent such as ethanol are added to the raw material powder, and wet mixing is performed by using a ball mill so as to prepare a slurry. The resulting ceramic slurry is subjected to sheet forming by a doctor blade method so as to obtain, for example, a ceramic green sheet having a thickness of 1.9 μm.

Subsequently, an inner electrode conductive paste 1 for forming the first inner electrode layer 16a is prepared. A Ni powder is prepared as a conductive powder, a polyvinyl-butyral-based binder and an organic solvent such as ethanol are added, and wet mixing is performed by using a ball mill so as to produce the inner electrode conductive paste 1.

Further, an inner electrode conductive paste 2 for forming the second inner electrode layer 16b is prepared. A Ni—Pt alloy powder is prepared as a conductive powder, a polyvinyl-butyral-based binder and an organic solvent such as ethanol are added, and wet mixing is performed by using a ball mill so as to produce the inner electrode conductive paste 2. Regarding the prepared Ni—Pt alloy powder, a ratio Pt/(Ni+Pt) is adjusted to be, for example, 2.3% by mole or more and 25.5% by mole or less.

Subsequently, the surface of the ceramic green sheet is printed with the prepared inner electrode conductive paste 1 so that a print pattern for the first inner electrode layer 16a is formed. The resulting sheet serves as a printed green sheet 1.

On the other hand, the surface of the ceramic green sheet is printed with the inner electrode conductive paste 2 so that a print pattern for the second inner electrode layer 16b is formed. The resulting sheet serves as a printed green sheet 2.

In this regard, the ceramic green sheet can be printed with the inner electrode conductive paste 1 and the inner electrode conductive paste 2 by a known method such as screen printing or gravure printing.

The printed green sheet 2 is stacked on the printed green sheet 1. The two layers of green sheets are taken as a set, and a multilayer body block is produced by stacking a plurality of sets while print-pattern-extending sides are staggered.

Thereafter, the multilayer body block is cut into pieces each having a predetermined shape and dimensions so as to cut unfired multilayer body chips. In such an instance, corner portions and ridge portion of the multilayer body may be rounded by barrel polishing or the like.

The cut unfired multilayer body chips are, for example, heated in a $N_2$ atmosphere at a temperature of 350° C. so as to burn the binder, the temperature is increased at 20° C./min in a reducing atmosphere composed of a $H_2$—$N_2$—$H_2O$ gas having an oxygen partial pressure of $10^{-12}$ MPa or higher and $10^{-10}$ MPa or lower, and firing is performed at 1,200° C. or higher and 1,265° C. or lower for 20 min. Since it becomes difficult for the inner electrode layer to be sintered with an increasing amount of Pt in the inner electrode layer, the firing temperature has to be set to a high temperature.

An outer electrode conductive paste is applied and baked onto both end surfaces of the fired multilayer body 12 so that the first underlying electrode layer 26a of the first outer electrode 24a electrically coupled to the first inner electrode layer 16a and the second underlying electrode layer 26b of the second outer electrode 24b electrically coupled to the second inner electrode layer 16b are formed. For example, a Cu paste including a $B_2O_3$—$SiO_2$—BaO-based glass frit is used as the outer electrode conductive paste. In this regard, baking is performed in a $N_2$ atmosphere at 900° C.

As the situation demands, the first plating layer 28a is formed so as to cover the first underlying electrode layer 26a, and the second plating layer 28b is formed so as to cover the second underlying electrode layer 26b.

When the first plating layer 28a and the second plating layer 28b are formed from a Ni plating layer, wet electrolytic plating is used as the forming method.

In this regard, when the first plating layer 28a and the second plating layer 28b are formed having a two-layer structure, as the situation demands, a Sn plating layer is formed on each of the Ni plating layers by the wet electrolytic plating.

The multilayer ceramic capacitor 10 according to the present preferred embodiment is produced as described above.

In the above-described manufacturing method, the conductive paste using a powder including a Ni—Pt alloy as a primary component is used as the measure to forming the inner electrode layer by using an alloy composed of Ni and Pt. However, the manufacturing method is not limited to this, and a conductive paste in which a Pt metal, an alloy including Pt, or a Pt compound is mixed in an alloy powder including a Ni powder or Ni as a primary component may be used.

In the above-described manufacturing method, the multilayer body block is produced by stacking the printed green sheet 2 on the printed green sheet 1, taking the two layers of green sheets as a set, and stacking a plurality of sets while print-pattern-extending sides are staggered. However, the multilayer body block may be produced by stacking the printed green sheet 1 on the printed green sheet 2, taking the two layers of green sheets as a set, and stacking a plurality of sets while print-pattern-extending sides are staggered.

According to the multilayer ceramic capacitor 10 of a preferred embodiment of the present invention, Ni included in one of the first inner electrode layer 16a and the second inner electrode layer 16b forms a solid solution with Pt. Further, Ni included in the other of the first inner electrode layer 16a and the second inner electrode layer 16b forms no solid solution with Pt, at least one of the first inner electrode layer 16a and the second inner electrode layer 16b in which Ni forms a solid solution with Pt is coupled to the cathode when the multilayer ceramic capacitor is mounted, and, therefore, the dielectric breakdown voltage of the multilayer ceramic capacitor is improved.

The mechanism of the dielectric breakdown voltage due to concentration of an electric field being able to be reduced or prevented as described above is conjectured to be as follows. That is, a portion of Ni included in the inner electrode layer 16 being substituted with Pt increases the work function of the resulting metal (electrode). It is conjectured that the metal being disposed as the cathode increases the Schottky barrier between the ceramics and the inner electrode layer in the cathode so as to relax electric field concentration. As a result, it is conjectured that the dielectric breakdown voltage of the multilayer ceramic capacitor 10 is improved.

In addition, according to the multilayer ceramic capacitor 10 of a preferred embodiment of the present invention, when Ni included in one of the first inner electrode layer 16a and the second inner electrode layer 16b forms a solid solution with Pt, a molar ratio of Pt with respect to the total of Ni and Pt being about 2.6% by mole or more and about 24.7% by mole or less, for example, that is, setting the molar ratio of Pt with respect to the total of Ni and Pt to be within the above-described range enables the dielectric breakdown voltage to be improved and enables the high-temperature loading life to be improved.

3. Examples

Next, to examine the advantages of the multilayer ceramic capacitor 10 according to a preferred embodiment of the present invention, non-limiting experiments for evaluating the dielectric breakdown voltage and the high-temperature loading life of a multilayer ceramic capacitor were performed.

(1) Production of Sample for Evaluation

A multilayer ceramic capacitor serving as non-limiting samples of each example (Sample No. 1 to Sample No. 20) was produced under the following conditions by using the above-described manufacturing method.

(a) Design Condition

The size (design value) of the multilayer ceramic capacitor was length×width×height=1.0 mm×0.5 mm×0.5 mm, the thickness of each dielectric layer interposing between a plurality of inner electrode layers was 1.5 μm, and the average thickness of the inner electrode layers was 0.9 μm. The total number of the inner electrode layers was set to be 150 layers. The primary component of the material for forming the dielectric layer was set to be $BaTiO_3$. Regarding the structure of the outer electrode, the underlying electrode layer was set to be a baked Cu-paste layer and the plating layer was set to have a two-layer structure of Ni plating and Sn plating.

(b) Production Condition of Each Sample

Regarding Sample No. 1 to Sample No. 7, the multilayer body A was obtained by stacking the printed green sheet 2 on the printed green sheet 1, taking the two layers of green sheets as a set, and stacking a plurality of sets while print-pattern-extending sides were staggered. That is, Ni in the first inner electrode layer formed no solid solution with Pt, and Ni in the second inner electrode layer formed a solid solution with Pt. Regarding Sample No. 1 to Sample No. 7, the content of Pt that formed a solid solution with Ni in the second inner electrode layer was changed. Therefore, the Ni—Pt alloy powder was prepared so that the ratio Pt/(Ni+Pt) in the second inner electrode layer was set to be 2.3% by mole for Sample No. 1, 2.6% by mole for Sample No. 2, 7.8% by mole for Sample No. 3, 13.5% by mole for Sample No. 4, 19.3% by mole for Sample No. 5, 24.7% by mole for Sample No. 6, and 25.5% by mole for Sample No. 7.

Regarding Sample No. 8 to Sample No. 14, the multilayer body B was obtained by stacking the printed green sheet 1 on the printed green sheet 2, taking the two layers of green sheets as a set, and stacking a plurality of sets while print-pattern-extending sides were staggered. That is, Ni in the first inner electrode layer formed a solid solution with Pt, and Ni in the second inner electrode layer formed no solid solution with Pt. Regarding Sample No. 8 to Sample No. 14, the content of Pt that formed a solid solution with Ni in the first inner electrode layer was changed. Therefore, the Ni—Pt alloy powder was prepared so that the ratio Pt/(Ni+Pt) in the first inner electrode layer was set to be 2.3% by mole for Sample No. 8, 2.6% by mole for Sample No. 9, 7.8% by mole for Sample No. 10, 13.5% by mole for Sample No. 11, 19.3% by mole for Sample No. 12, 24.7% by mole for Sample No. 13, and 25.5% by mole for Sample No. 14.

Regarding Sample No. 15 to Sample No. 19, the multilayer body C was obtained by using only the printed green sheet 2 and stacking a plurality of the printed green sheets 2 while print-pattern-extending sides were staggered. That is, Ni in each of the first inner electrode layer and the second inner electrode layer formed a solid solution with Pt. Regarding Sample No. 15 to Sample No. 19, the content of Pt that formed a solid solution with Ni in each of the first inner electrode layer and the second inner electrode layer was changed. Therefore, the Ni—Pt alloy powder was prepared so that the ratio Pt/(Ni+Pt) in each of the first inner electrode layer and the second inner electrode layer was set to be 2.3% by mole for Sample No. 15, 7.8% by mole for Sample No. 16, 13.5% by mole for Sample No. 17, 19.3% by mole for Sample No. 18, and 24.7% by mole for Sample No. 19.

Regarding Sample No. 20, the multilayer body D was obtained by using only the printed green sheet 1 and stacking a plurality of the printed green sheets 1 while print-pattern-extending sides were staggered. That is, Ni in each of the first inner electrode layer and the second inner electrode layer formed no solid solution with Pt.

The uppermost LW surface (last-stacking-side surface) of each of the multilayer bodies was divided into three equal regions in the L-direction, and the region into which the inner electrode conductive paste 2 including the Ni—Pt alloy powder extended was printed with a paste including Ni as a primary component in a figure having a size of about 0.1 mm in the length direction z and about 0.2 mm in the width direction y, for example, so that the end surface to which the inner electrode layer including Pt as a solid solution extended could be determined even after the outer electrode was formed.

In this regard, in the present non-limiting examples, the extension side of the inner electrode layer including Pt as a solid solution was determined by the above-described method, but there is no particular limitation regarding the measure provided that determination can be performed.

The number of samples prepared for each sample number was 40 (total number of 800). Regarding each sample number, 20 samples were used for measuring the dielectric breakdown voltage, and the other 20 samples were used for the high temperature loading test.

(2) Evaluation Item and Evaluation Method (a) Examination of Presence of Pt in Inner Electrode Layer Regarding each sample (multilayer ceramic capacitor) in Table 1 produced as described above, presence of Pt in the inner electrode layer was examined by the method described below.

Polishing

Each sample was vertically stood and surroundings of each sample was hardened with a resin. In such an instance, the WT surface of each sample was exposed. Subsequently, the WT surface was polished by using a polishing machine. Polishing was completed at a depth of about half the multilayer ceramic capacitor in the length direction z so as to expose the WT surface. To eliminate sagging of the inner electrode layer due to polishing, after completion of polishing, polished surface was worked by ion milling.

Mapping Analysis of Inner Electrode Layer

Figure 5:
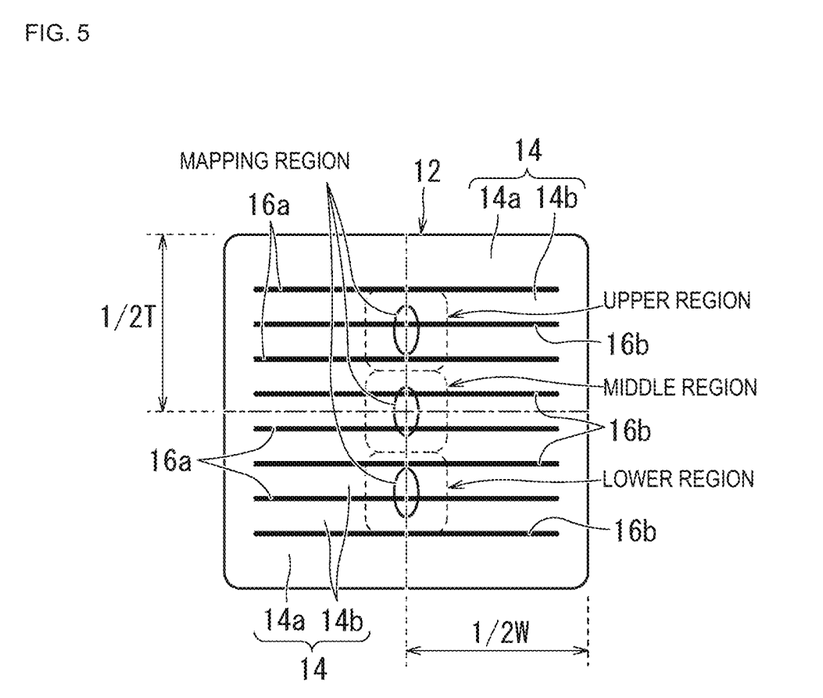
FIG. 5 is an illustration diagram to indicate regions in the inner electrode layers of a multilayer ceramic capacitor in which mapping analysis of Ni and Pt is performed in experimental examples.

As illustrated in FIG. 5, regarding the WT surface at about half in the length direction z, the region in which the inner electrode layers of the sample were stacked was divided into three equal regions in the stacking direction x, and the central portion in the width direction y of each region was denoted as an upper region, a middle region, or a lower region. The central section of each region was set to be a mapping region, and in each mapping region, mapping analysis of Ni and Pt was performed by WDX (wavelength-dispersive X-ray analysis). As a result, regarding the sample of each sample number, it was ascertained that, when Pt was included in the inner electrode layer, the ratio Pt/(Ni+Pt) indicated a predetermined content.

Regarding each of Sample No. 1 to Sample No. 7, the content of Pt in the first inner electrode layer was a detection limit or lower. Regarding each of Sample No. 8 to Sample No. 14, the content of Pt in the second inner electrode layer was a detection limit or lower. Further, regarding Sample No. 20, the content of Pt in each of the first inner electrode layer and the second inner electrode layer was a detection limit or lower.

(b) Measurement of Dielectric Breakdown Voltage

Sampling of 20 produced samples was performed, the multilayer ceramic capacitor was set into a dielectric breakdown voltage measuring instrument, where the mark on the uppermost LW surface was checked so that the electrode of the measuring instrument to which the inner electrode layer including a solid solution of Ni and Pt was coupled was checked. Subsequently, the dielectric breakdown voltage was measured at a voltage increasing rate of 100 V/sec, and an average value of the dielectric breakdown voltage was determined. A sample having a dielectric breakdown voltage of less than 240 V was rated defective.

(c) High Temperature Loading Test

Sampling of other 20 produced samples was performed, the multilayer ceramic capacitor was set into a high temperature loading test machine, where the mark on the uppermost LW surface was checked so that the electrode of the test machine to which the inner electrode layer including a solid solution of Ni and Pt was coupled was checked. Subsequently, the high temperature loading test was performed at 150° C. and 40 V, and a time when the insulation resistance reached 10 kΩ or less was assumed to be a time to failure. The mean time to failure (MTTF) was calculated from the resulting time to failure, and comparison was performed. A sample having a MTTF of less than 31 hours was rated defective.

(3) Evaluation Result

Table 1 presents the evaluation results of the multilayer ceramic capacitor of each sample number. In this regard, sample numbers marked with an asterisk in the table indicate samples out of the scope of the present invention. In particular, samples of Sample No. 15 to Sample No. 19 in which the first inner electrode layer and the second inner electrode layer included a solid solution of Pt are presented as reference examples.

TABLE 1

| Sample No. | Multilayer body | Concentration of Pt in inner electrode layer coupled to cathode (mol %) | Concentration of Pt in inner electrode layer coupled to anode (mol %) | Firing temperature (° C.) | Dielectric breakdown voltage (V) | MTTF (hr) |
|---|---|---|---|---|---|---|
| 1 | A | 2.3 | detection limit or lower | 1210 | 250 | 30.2 |
| 2 | A | 2.6 | detection limit or lower | 1210 | 282 | 32.4 |
| 3 | A | 7.8 | detection limit or lower | 1220 | 278 | 31.0 |
| 4 | A | 13.5 | detection limit or lower | 1230 | 287 | 32.5 |
| 5 | A | 19.3 | detection limit or lower | 1240 | 280 | 35.1 |
| 6 | A | 24.7 | detection limit or lower | 1245 | 285 | 34.2 |
| 7 | A | 25.5 | detection limit or lower | 1260 | 248 | 24.1 |
| *8 | B | detection limit or lower | 2.3 | 1210 | 225 | 29.8 |
| *9 | B | detection limit or lower | 2.6 | 1210 | 222 | 23.4 |
| *10 | B | detection limit or lower | 7.8 | 1220 | 219 | 22.2 |
| *11 | B | detection limit or lower | 13.5 | 1220 | 228 | 21.6 |
| *12 | B | detection limit or lower | 19.3 | 1240 | 228 | 22.1 |
| *13 | B | detection limit or lower | 24.7 | 1245 | 230 | 20.9 |
| *14 | B | detection limit or lower | 25.5 | 1265 | 197 | 17.3 |
| *15 | C | 2.3 | 2.3 | 1210 | 280 | 23.1 |
| *16 | C | 7.8 | 7.8 | 1220 | 273 | 23.4 |
| *17 | C | 13.5 | 13.5 | 1230 | 271 | 22.3 |
| *18 | C | 19.3 | 19.3 | 1240 | 275 | 22.7 |

TABLE 1-continued

| Sample No. | Multilayer body | Concentration of Pt in inner electrode layer coupled to cathode (mol %) | Concentration of Pt in inner electrode layer coupled to anode (mol %) | Firing temperature (° C.) | Dielectric breakdown voltage (V) | MTTF (hr) |
|---|---|---|---|---|---|---|
| * 19 | C | 24.7 | 24.7 | 1245 | 266 | 21.8 |
| * 20 | D | detection limit or lower | detection limit or lower | 1200 | 230 | 31.3 |

As presented in Table 1, regarding the samples of Sample No. 8 to Sample No. 14 out of the scope of the present invention, since Ni included in the first inner electrode layer formed a solid solution with Pt, Ni included in the second inner electrode layer formed no solid solution with Pt, and the second inner electrode layer including no solid solution of Pt was coupled to the cathode, it was ascertained that all the samples of Sample No. 8 to Sample No. 14 had a dielectric breakdown voltage of less than 240 V and, therefore, were defective and that the mean time to failure (MTTF) was less than 31 hours and, therefore, the samples were defective.

Regarding the sample of Sample No. 20 out of the scope of the present invention, since Ni included in the first inner electrode layer and the second inner electrode layer formed no solid solution with Pt, it was ascertained that the dielectric breakdown voltage was less than 240 V and, therefore, the sample was defective.

On the other hand, regarding the samples of Sample No. 1 to Sample No. 7, since Ni included in the second inner electrode layer formed a solid solution with Pt, Ni included in the first inner electrode layer formed no solid solution with Pt, and the second inner electrode layer including a solid solution of Pt was coupled to the cathode, it was ascertained that all the samples of Sample No. 1 to Sample No. 7 had a dielectric breakdown voltage of 240 V or more and, therefore, favorable results were obtained.

Further, regarding the samples of Sample No. 2 to Sample No. 6, it was ascertained that, when the ratio Pt/(Ni+Pt) in the second inner electrode layer was about 2.6% by mole or more and about 24.7% by mole or less, for example, the dielectric breakdown voltage was further improved, the mean time to failure (MTTF) was 31 hours or more, and, therefore, favorable results were obtained.

The mechanism of the dielectric breakdown voltage due to concentration of an electric field being able to be suppressed is conjectured to be as follows. That is, a portion of Ni included in the inner electrode layer 16 being substituted with Pt increases the work function of the metal (electrode). It is conjectured that the resulting metal being disposed as the cathode increases the Schottky barrier at the interface between the ceramics and the inner electrode layer in the cathode so as to relax electric field concentration. As a result, it is conjectured that the dielectric breakdown voltage of the multilayer ceramic capacitor 10 is improved.

When the concentration of Pt is less than about 2.6% by mole, for example, it is conjectured that an effect of enhancing the Schottky barrier is small. On the other hand, when the concentration of Pt is more than about 24.7% by mole, for example, it is conjectured that the firing temperature is increased, an opposite-electrode-side inner electrode layer (the concentration of Pt is detection limit or lower) is excessively sintered so as to become spherical, the thickness of the dielectric ceramic element was thereby decreased due to being pressed, and the electric field is concentrated on this portion so as to decrease the dielectric breakdown voltage.

Regarding the samples of Sample No. 15 to Sample No. 19 presented as reference examples, since Ni included in each of the first inner electrode layer and the second inner electrode layer formed a solid solution with Pt, it was ascertained that the sample of each of Sample No. 15 to Sample No. 19 had a dielectric breakdown voltage of 240 V or more.

As described above, the preferred embodiments according to the present invention are disclosed above. However, the present invention is not limited to these.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including dielectric layers stacked in a stacking direction, a first main surface and a second main surface opposite to each other in the stacking direction, a first side surface and a second side surface opposite to each other in a width direction orthogonal to the stacking direction, and a first end surface and a second end surface opposite to each other in a length direction orthogonal to the stacking direction and the width direction;
a plurality of first inner electrode layers on the dielectric layers and exposed at the first end surface;
a plurality of second inner electrode layers on the dielectric layers and exposed at the second end surface;
a first outer electrode coupled to the first inner electrode layers and located on the first end surface; and
a second outer electrode coupled to the second inner electrode layers and located on the second end surface; wherein
the first inner electrode layers and the second inner electrode layers are alternately positioned;
the first inner electrode layers and the second inner electrode layers include Ni;
Ni included in one of the first inner electrode layers and the second inner electrode layers forms a solid solution with Pt;
Ni included in the other of the first inner electrode layers and the second inner electrode layers forms no solid solution with Pt; and
the one of the first inner electrode layers and the second inner electrode layers in which Ni forms a solid solution with Pt are coupled to a cathode when the multilayer ceramic capacitor is mounted.

2. The multilayer ceramic capacitor according to claim 1, wherein a ratio Pt/(Ni+Pt) in the one of the first inner electrode layers and the second inner electrode layers in which Ni forms a solid solution with Pt is about 2.6% by mole or more and about 24.7% by mole or less.

3. The multilayer ceramic capacitor according to claim 1, wherein each of the dielectric layers has a thickness of about 0.5 μm or more and about 10 μm or less.

4. The multilayer ceramic capacitor according to claim 1, wherein the first inner electrode and the second inner electrode include dielectric particles.

5. The multilayer ceramic capacitor according to claim 4, wherein a composition of the dielectric particles and a composition of the dielectric layers are the same.

6. The multilayer ceramic capacitor according to claim 1, wherein a heterogeneous phase including Ni and an element included in the dielectric layers is present in the dielectric layers and at least one of the first and second inner electrode layers.

7. The multilayer ceramic capacitor according to claim 1, wherein each of the first and second inner electrode layers has a thickness of about 0.2 μm or more and about 2.0 μm or less.

8. The multilayer ceramic capacitor according to claim 1, wherein the first outer electrode extends from the first end surface to cover a portion of each of the first main surface, the second main surface, the first side surface and the second side surface.

9. The multilayer ceramic capacitor according to claim 1, wherein the second outer electrode extends from the second end surface to cover a portion of each of the first main surface, the second main surface, the first side surface and the second side surface.

10. The multilayer ceramic capacitor according to claim 1, wherein the first outer electrode includes a first underlying electrode layer and a first plating layer, and the second outer electrode includes a second underlying electrode layer and a second plating layer.

11. The multilayer ceramic capacitor according to claim 10, wherein the first underlying electrode layer is located only on the first end surface.

12. The multilayer ceramic capacitor according to claim 10, wherein the second underlying electrode layer is located only on the second end surface.

13. The multilayer ceramic capacitor according to claim 10, wherein each of the first underlying electrode layer and the second underlying electrode layer includes a baked layer or a thin film layer.

14. The multilayer ceramic capacitor according to claim 13, wherein the baked layer includes glass and a metal.

15. The multilayer ceramic capacitor according to claim 13, wherein the baked layer is multilayered.

16. The multilayer ceramic capacitor according to claim 13, wherein the baked layer has a maximum thickness of about 10 μm or more and about 50 μm or less.

17. The multilayer ceramic capacitor according to claim 13, wherein a resin layer is located on the baked layer.

18. The multilayer ceramic capacitor according to claim 10, wherein the first underlying electrode layer and the second underlying electrode layer include Cu.

19. The multilayer ceramic capacitor according to claim 10, wherein the first plating layer and the second plating layer include Sn or Au.

20. The multilayer ceramic capacitor according to claim 1, wherein the first outer electrode includes only a first underlying electrode layer, and the second outer electrode includes only a second underlying electrode layer.

* * * * *